United States Patent [19]
Stoller

[11] Patent Number: 5,232,063
[45] Date of Patent: Aug. 3, 1993

[54] WEIGHING APPARATUS WITH VIBRATORY STRING FORCE SENSOR

[75] Inventor: Beat Stoller, Greifensee, Switzerland

[73] Assignee: Mettler-Toledo AG, Greifensee, Switzerland

[21] Appl. No.: 824,405

[22] Filed: Jan. 23, 1992

[30] Foreign Application Priority Data

Mar. 19, 1991 [CH] Switzerland .................. 825/91/7

[51] Int. Cl.⁵ .................................................. G01G 3/14
[52] U.S. Cl. ............................................. 177/210 FP
[58] Field of Search ................................. 177/210 FP

[56] References Cited

U.S. PATENT DOCUMENTS

| | | |
|---|---|---|
| 4,090,575 | 5/1978 | Kunz et al. . |
| 4,280,577 | 7/1981 | Kunz . |
| 4,429,757 | 2/1984 | Kunz . |
| 4,464,725 | 8/1984 | Briefer . |
| 4,513,831 | 4/1985 | Lee et al. ............. 177/210 FP X |
| 4,623,030 | 11/1986 | Portman, Jr. et al. ........ 177/210 FP |
| 4,765,377 | 8/1988 | Soloway .................... 177/210 FP X |
| 4,838,369 | 6/1989 | Albert ........................... 177/210 FP |

Primary Examiner—George H. Miller, Jr.
Attorney, Agent, or Firm—Laubscher & Laubscher

[57] ABSTRACT

A weighing scale includes a vibratory string force measuring device (1) the frequency of which varies as a function of the applied load. The load signal from the vibratory string device is supplied to a microprocessor (8) where it is processed with a first frequency signal supplied by a temperature-responsive first quartz oscillator (9), thereby to produce a load measurement output signal (GW), the first frequency signal serving also as the clock signal for the microprocessor. The microprocessor also compares the first frequency signal with a second frequency signal supplied by a temperature-independent second quartz oscillator (11), thereby to produce a temperature compensation signal (TW).

7 Claims, 2 Drawing Sheets

5,232,063

WEIGHING APPARATUS WITH VIBRATORY STRING FORCE SENSOR

STATEMENT OF THE INVENTION

This invention relates to an electromechanical weighing apparatus including a load-responsive variable-frequency force sensor, and a microprocessor for transforming the load signal from the sensor into an output load measurement signal, characterized in that a temperature-responsive first quartz oscillator serves both as the clock generator for the microprocessor and as a timing signal with which the load signal from the force sensor is compared to produce a load measurement output signal (GW). The microprocessor further compares the frequency signal of the first quartz oscillator with that of a common temperature-independent second quartz oscillator, thereby to produce a temperature compensation signal (TW).

BRIEF DESCRIPTION OF THE PRIOR ART

To improve the accuracy of electromechanical weighing scales, it is common in the art to compensate for the temperature dependence of the oscillation frequency of the force sensor in such a fashion that one achieves a scale sensitivity that is independent of temperature. Other temperature-dependent weighing parameters also require correction in order, for example, to keep the zero point shifts and the linearity deviations as small as possible.

It is furthermore known that one can directly compensate for the temperature influence upon the weighing parameters either by measures that are based on immediate counteraction, or mathematically determine a correction magnitude—that is to be related to the measurement magnitude—on the basis of the continually measured scale temperature. In both cases, one may encounter difficulties when the weighing parameters, as well as any possible compensation means or temperature sensors, are subject to severe scatter and include nonlinearities, so that an adjustment of each scale, under certain circumstances at several temperature values, is necessary to achieve an exact compensation effect. From that viewpoint, one should therefore try to achieve low-scatter components that work as accurately as possible and in as linear fashion as possible—something which, however, on the other hand can lead to entirely too expensive compensation solutions.

According to the U.S. Pat. No. 4,464,725, to Briefer temperature compensation is performed on the basis of mathematically determined correction magnitudes wherein there is provided a separate frequency-transmitting temperature sensor and where the clock generator of the microprocessor serves as a timer for the measurement of the temperature-dependent oscillation frequency of the temperature sensor.

In this solution, one does not use any directly acting compensation measures. The temperature sensor measures the temperature of the scale, whereby the measured temperature values are used for the mathematical correction of the measurement magnitude. This kind of comprehensive temperature compensation of the weighing parameters is possible, however, only with a comparatively large effort as regards hardware and software if one wants to avoid voluminous adjustment work.

The present invention was developed to solve the problem mentioned in a simple fashion and with little effort.

SUMMARY OF THE INVENTION

Accordingly, a primary object of the present invention is to provide an improved electromechanical weighing apparatus, characterized in that a first quartz oscillator is provided having a temperature-dependent oscillation frequency and which serves as a temperature sensor for the measurement of the scale temperature, that the temperature dependence of the oscillation frequency of this first quartz oscillator is adapted to that of the force sensor, and that a second quartz oscillator is provided with an oscillation frequency that is at least approximately independent of the temperature, said second quartz oscillator serving as a timer for the measurement of the temperature-dependent oscillation frequency of the first quartz oscillator.

According to a more specific object of the invention, the second quartz oscillator comprises a simple inexpensive clock oscillator. The first quartz oscillator, which serves as clock generator for the microprocessor and as a timer for the measurement of the oscillation frequency of the frequency-transmitting force sensor, is a comparatively expensive component because of the required tight quality tolerances in view of the above-mentioned tasks. In the solution according to the aforementioned Briefer U.S. Pat. No. 4,464,725, the temperature sensor requires just as high-grade a component, for example, in the form of a quartz oscillator, in order to meet the previously mentioned accuracy requirements. In the solution according to the present invention, however, the functions of the two quartz oscillators as regards temperature measurements are, more or less, exchanged, in that the clock generator of the microprocessor also performs the function of a temperature sensor, whereby the second quartz oscillator merely serves as timer, something for which cheaper models are available.

According to a further object of the invention, the first quartz oscillator also serves for the direct temperature compensation of the force sensor, i.e. the temperature dependency of the frequency of the first quartz crystal is chosen to at least essentially correspond to the temperature dependency of the frequency of the mounted vibrating force sensor. The latter measures offer not only the advantage that the already existing high-grade quartz oscillator is utilized better but also the further advantage that temperature compensation based on a direct counteraction is more accurate than the mathematical correction method under the given prerequisites. Further, because the characteristic of the force sensor represents the most important weighing parameter, the measure proposed here thus assumes special significance. The decisive factor here is the circumstance that frequency-transmitting force sensors, (for example, string or chord oscillators), can be made only with very small scatter of the characteristic so that an adjustment can be dispensed with in this regard.

The accurate temperature measurement serves for the mathematical correction of the weighing result on the basis of the other temperature-dependent weighing parameters. For this purpose, one needs a second quartz oscillator only as timer in the context of the solution according to the invention. For that purpose, one can use commercially available quartz oscillator intended for clocks. So-called "clock" quartz crystals are very reasonably priced, but they nevertheless offer the accuracy required for the above-mentioned purpose and are extensively temperature-independent. The use of a temperature-independent quartz oscillator as a timer for the frequency-transmitting temperature sensor furthermore offers the advantage that, as regards temperature measurement it is no longer two temperature-dependent quartz oscillators with differing temperature dependency of the frequency that are decisive as is otherwise customary in most cases; instead, only one single quartz oscillator is decisive. In this way, one reduces the interference potential.

In the scale according to the aforementioned Briefer U.S. Pat. No. 4,464,725, on the other hand, a corresponding solution with clock quartz is not possible because a clock quartz with an oscillation frequency of usually 32.768 kHz is not suitable for use as timer for the measurement of the oscillation frequency of the force sensor and as clock generator of the microprocessor in high-resolution scales (clock frequency about 16 Mhz).

According to still another object of the invention, the printed circuit board carries the microprocessor components in close proximity to the temperature sensing means. Thereby to insure proper microprocessor operation. Thus, to make sure that the microprocessor will function perfectly, its clock generator must be in its immediate vicinity. On the other hand, the clock generator, that now also works as temperature sensor, should be arranged if at all possible near those parts of a weighing cell at which appear the temperature-dependent effects that have to be compensated. Preferably, therefore the printed circuit board carrying the microprocessor components is mounted on the weighing cell containing the force sensor and is arranged therewith in a common housing in order to achieve the most accurate possible recording of the temperature curve in the weighing cell.

According to a further object of the invention, the first quartz oscillator is selected to have a first order temperature coefficient ($\alpha_1$) of the power factor equation to deviate from zero, while the second quartz oscillator has a first order temperature coefficient $\alpha_2$ that equals zero. For quartz crystals having first ($\alpha_1, \alpha_2$) and second ($\beta_1, \beta_2$) temperature coefficients, it is apparent that at a given temperature [for example, $T=25°$ C.$+\Delta T$]:

$$\text{Quartz 1: } f_1 = f_{1\ 25° C.} (1 + \alpha_1 \Delta T + \beta_1 \Delta T^2 + \ldots) \quad (1)$$

$$\text{Quartz 2: } f_2 = f_{2\ 25° C.} (1 + \alpha_2 \Delta T + \beta_2 \Delta T^2 + \ldots) \quad (2)$$

Whereby the quotient of these equations equals (for $\alpha \Delta T, \beta \Delta T << 1$):

$$\frac{f_1}{f_2} = \frac{f_1\ 25° C.}{f_2\ 25° C.} [1 + (\alpha_1 - \alpha_2) \Delta T + (\beta_1 - \beta_2)\Delta T^2 + \ldots] \quad (3)$$

Thus, the quotient from the two frequency values is only a function of temperature, as obtained from equation (3). Since, according to the present invention, a type of crystal is selected for the second quartz oscillator whose frequency is independent of the temperature at least in a first approximation (temperature coefficient $\alpha_2 = 0$), only the temperature of the first quartz oscillator is decisive for the temperature measurement.

Another advantage occurs when, for the quartz of the two quartz oscillators, one selects types where the coefficients ($\beta$) of the second order component of the temperature function, illustrated as power series, are equal to each other. In this case, a linear dependence of the temperature is obtained according to equation (3). Here, an adjustment suffices at a certain temperature value (for example, 20° C.), so that one gets the absolute temperature as measurement magnitude. In many cases, however, it is possible to get along without the previously mentioned adjustment because the relative accuracy of the temperature measurement is mostly adequate for compensation purposes.

BRIEF DESCRIPTION OF THE DRAWINGS

Other objects and advantages of the invention will become apparent from a study of the following specification when viewed in the light of the accompanying drawings in which.

DETAILED DESCRIPTION

Figure 1:
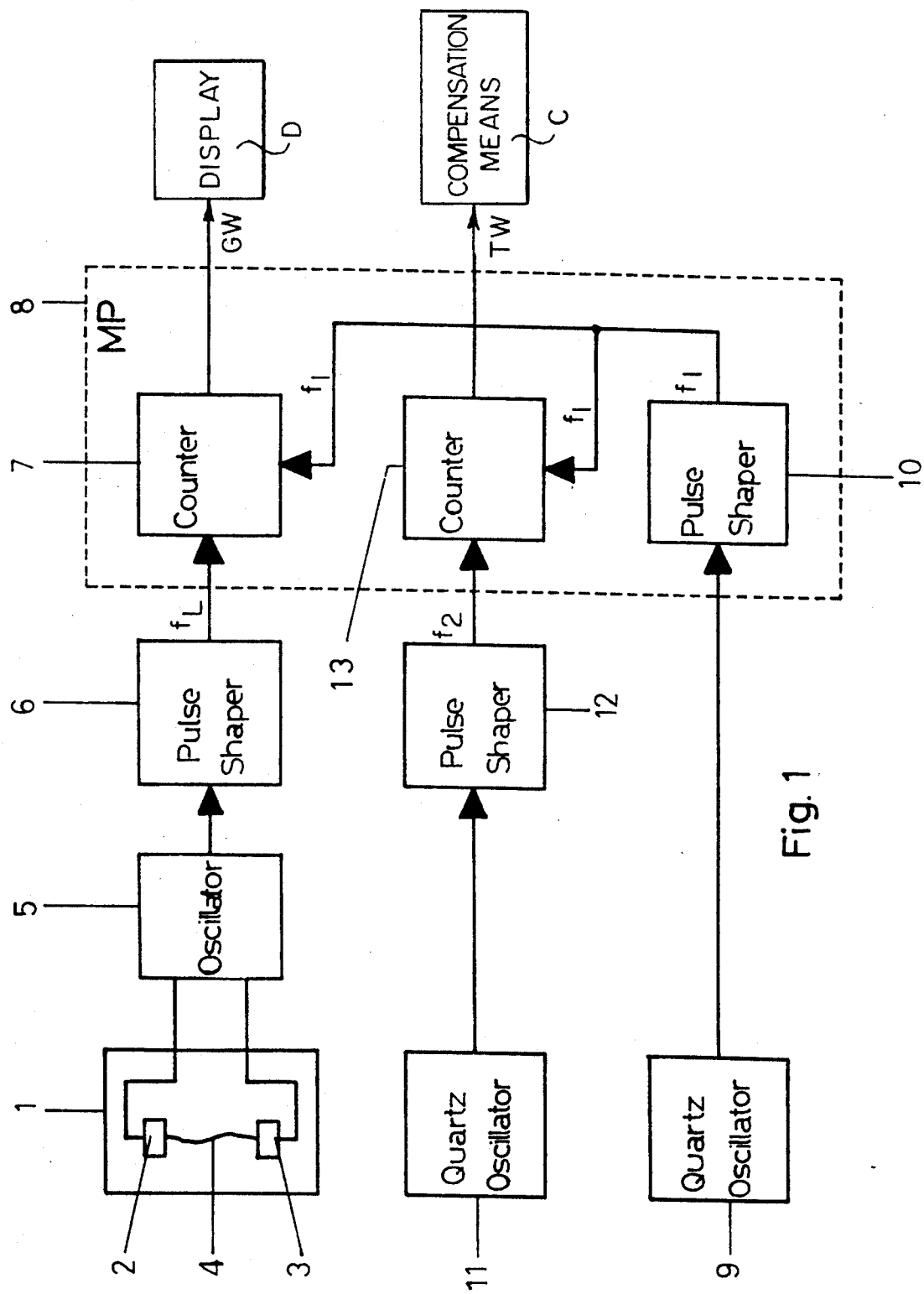
FIG. 1 is a block diagram of the electrical circuitry of the vibratory string type weighing apparatus of the present invention.

Referring first more particularly to FIG. 1, the weighing apparatus of the present invention includes a force-responsive oscillatory vibratory-string type sensor 1 including a string or chord member 4 tensioned between fixed supports 2 and 3, which string member is driven at its resonance frequency by the oscillator 5. At the output of oscillator 5, a signal is generated the frequency of which changes with the tensioning force of the oscillating string 4, (i.e., the force acting on supports 2 and 3, as the scale is loaded). This signal is supplied via a pulse shaper 6 to a counter 7 that is controlled by a microprocessor 8 (for example, a microprocessor known as INTEL Model No. 80 C 51 FA-1). As the clock generator for the microprocessor 8 and counter 7, there is provided a first quartz oscillator 9 the output of which is connected with a pulse shaper 10. By counting the counting pulses, there is determined in microprocessor 8 in a known manner the frequency value $F_L$ that corresponds to a certain scale load and, considering any possible corrections, there is calculated the load measurement outlet value GW to be read by the scale display indicator means D.. The first quartz oscillator 9 is formed as a frequency-transmitting temperature sensor, that is to say, it is equipped with a type of quartz whose temperature coefficient $\alpha_L$ has a value deviating from zero. One example of a suitable quartz of this type is the commercially available Philips quartz temperature sensor RW-43. The counting pulses from the pulse shaper 10 of quartz oscillator 9 are supplied to another counter 13 to determine the temperature value. As a timer there is used a second quartz oscillator 11 including a type of quartz having a temperature coefficient of $\alpha_2 = 0$ and has an output connected with a pulse shaper 12. One example of a suitable quartz crystal 11 is the commercially available Micro Crystal (ETA) Switzerland crystal type MX-IV. From the counting pulses of counter 13, microprocessor 8, in a manner similar to counter 7, now calculates the frequency value $f_2$ and finally the quotient of the two frequency values $f_1$ and $f_2$. The result is a digital temperature value TW that is available for compensation means C.

In order to obtain a scale sensitivity that is independent of the temperature, the temperature characteristic of the first quartz oscillator 9 is preferably adapted to that of the string oscillator 1. It is furthermore advantageous to select the types of quartz which are used for the two quartz oscillators 9 and 11 in such a manner that their second order quadratic temperature coefficients $\beta_x$ have the same value. This results in a linear relationship between the determined temperature value TW and the temperature prevailing on the temperature sensor 9.

Figure 2:
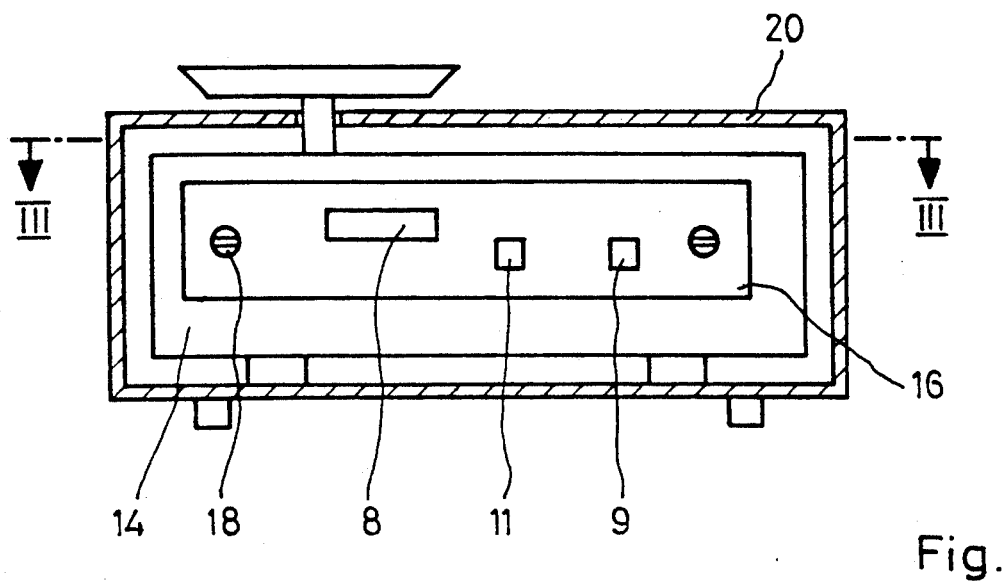
FIG. 2 is a sectional view of the weighing apparatus taken along line II—II of FIG. 3.
Figure 3:
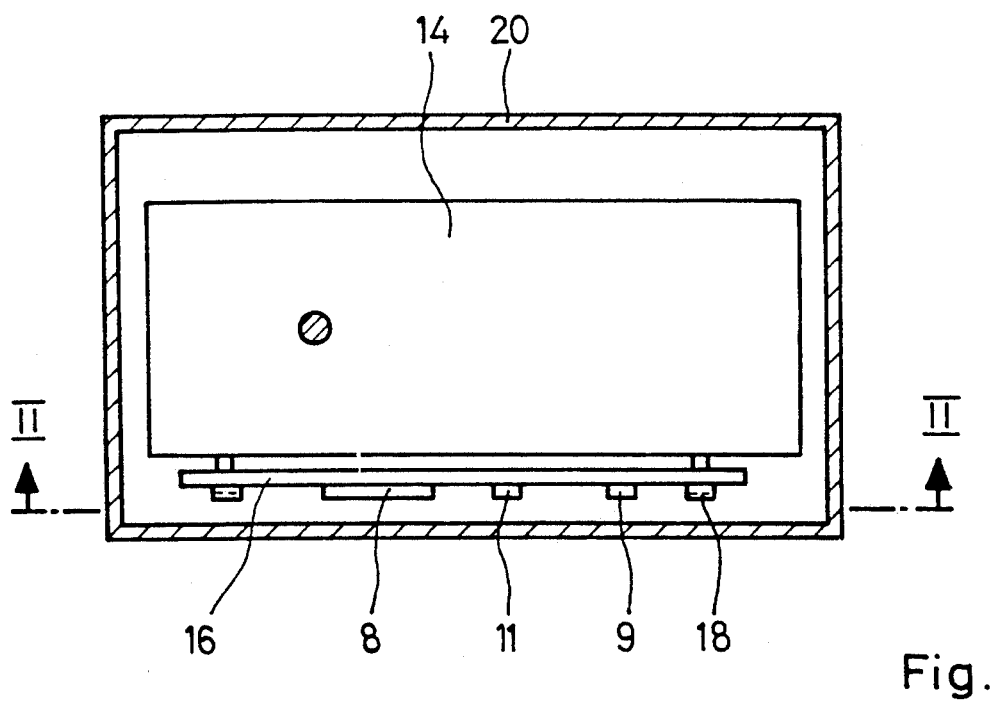
FIG. 3 is a sectional view taken along line III—III of FIG. 2.

In order to assume the best mode of operation of the quartz 9, the printed circuit board 16 on which, among other components, it is mounted is arranged in a common housing 20 with the weighing cell 14 which contains the force measuring sensor 4. The arrangement is preferably such that the printed circuit board 16 is mounted (e.g., by screws 18), closely adjacent the weighing or load cell 14. Thereby, the most accurate sensing possible of the temperature curve in the weighing cell can be achieved (FIGS. 2 and 3).

While in accordance with the provisions of the Patent Statutes the preferred form and embodiment of the invention has been illustrated and described, it is apparent that various changes and modifications may be made without deviating from the inventive concepts set forth above.

What is claimed is:

1. Electromechanical weighing apparatus of the vibratory force sensor type, comprising:
   (a) vibratory force measuring means (1) for producing a load signal the frequency ($f_L$) of which is a function of the magnitude of an applied load;
   (b) temperature-responsive first quartz oscillator means (9) for generating a first timing signal ($f_1$), said vibratory force measuring means and said first quartz oscillator means having oscillation frequencies the temperature dependencies of which are generally equal;
   (c) microprocessor means (8) for processing said load signal with said first timing signal to produce a load measurement output signal (GW), said first timing signal constituting the timing clock signal of said microprocessor means, whereby the dependency upon temperature of the sensitivity of the weighing apparatus is generally eliminated;
   (d) temperature-independent second quartz oscillator means (11) for generating a second timing signal;
   (e) said microprocessor means being further operable to process said first and second timing signals to produce a digital temperature compensation signal (TW).

2. Apparatus as defined in claim 1, wherein said second quartz oscillator means comprises a quartz clock oscillator of the type used in a timepiece.

3. Apparatus as defined in claim 1, wherein said first and second quartz oscillators each have the quadratic temperature equation:

$$f = f_{25} \cdot C \cdot (1 + \alpha \Delta T + B \Delta T^2 + \ldots),$$

and further wherein the second order coefficients ($\beta_1$, $B_2$) of the quadratic temperature equations of said first and second quartz oscillators are equal.

4. Apparatus as defined in claim 3, wherein the first order component ($\alpha_1$) of the quadratic temperature equation of the first quartz oscillator means deviates from zero, and further wherein the first order component ($\alpha_2$) of the second quartz oscillator equals zero.

5. Apparatus as defined in claim 1, wherein said microprocessor means is operable to produce said digital temperature compensation signal as the quotient of said first and second timing signals.

6. Apparatus as defined in claim 1, wherein said weighing apparatus includes a load cell containing said vibratory force measuring means; wherein said microprocessor means and said quartz oscillator means are mounted on a printed circuit board; and further wherein said weighing apparatus includes a common housing containing both said load cell and said printed circuit board, said printed circuit board being mounted adjacent said load cell.

7. Apparatus as defined in claim 1, wherein said vibratory force measuring means (1) comprises an oscillating string.

* * * * *